United States Patent
Vandermeijden (10) Patent No.: US 10,037,111 B2
(45) Date of Patent: Jul. 31, 2018

(54) SINGLE POINT CHARGER

(71) Applicant: Synaptics Incorporated, San Jose, CA (US)

(72) Inventor: Tom R. Vandermeijden, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 152 days.

(21) Appl. No.: 14/856,142

(22) Filed: Sep. 16, 2015

(65) Prior Publication Data

US 2017/0075446 A1 Mar. 16, 2017

(51) Int. Cl.
G06F 3/044 (2006.01)
G06F 3/0354 (2013.01)
G06F 3/041 (2006.01)

(52) U.S. Cl.
CPC .......... *G06F 3/044* (2013.01); *G06F 3/03545* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 5,030,846 A * | 7/1991 | Taylor | H03D 1/10 327/104 |
| 6,970,126 B1 | 11/2005 | O'Dowd et al. | |
| 6,995,602 B2 | 2/2006 | Pelliconi | |
| 7,304,483 B2 | 12/2007 | O'Dowd et al. | |
| 8,570,052 B1 | 10/2013 | Mahartya | |
| 8,866,500 B2 | 10/2014 | Kremin et al. | |
| 9,459,710 B1 * | 10/2016 | Brand | G06F 3/03545 |
| 2004/0251879 A1 | 12/2004 | Patino | |
| 2010/0075210 A1 * | 3/2010 | Lee | H01M 4/587 429/94 |
| 2012/0133327 A1 | 5/2012 | Lee | |
| 2012/0154340 A1 * | 6/2012 | Vuppu | G06F 3/044 345/179 |
| 2013/0002606 A1 * | 1/2013 | Mann | G06F 3/0383 345/174 |
| 2013/0083927 A1 * | 4/2013 | Savant | H04R 1/1025 381/2 |
| 2014/0247006 A1 * | 9/2014 | Yu | H02J 7/025 320/108 |
| 2014/0300586 A1 * | 10/2014 | Dowd | G06F 3/03545 345/179 |
| 2015/0123932 A1 * | 5/2015 | Collins | G06F 3/03545 345/174 |

\* cited by examiner

*Primary Examiner* — Benjamin C Lee
*Assistant Examiner* — Dong Hui Liang
(74) *Attorney, Agent, or Firm* — Ferguson Braswell Fraser Kubasta PC (57) ABSTRACT

In general, in one aspect, one or more embodiments relate to a peripheral device that includes a single charging terminal configured to couple to an active electrode driven with an alternating current (AC) signal, a diode for rectifying the AC signal from the active electrode to obtain a rectified signal, and a charging circuitry for charging an energy storage device using the rectified signal and a connection between the peripheral device and free space.

14 Claims, 6 Drawing Sheets

SINGLE POINT CHARGER

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a capacitive pen that includes a single charging terminal configured to couple to an active electrode driven with an alternating current (AC) signal, a diode for rectifying the AC signal from the active electrode to obtain a rectified signal, and a charging circuitry for charging an energy storage device using the rectified signal and a connection between the capacitive pen and free space.

In general, in one aspect, one or more embodiments relate to a system that includes an electronic device and a peripheral device. The electronic device includes an active electrode, and a processing system for driving the active electrode with an alternating current (AC) signal. The peripheral device includes a single charging terminal configured to couple to the active electrode, a diode for rectifying the AC signal from the active electrode to obtain a rectified signal, and a charging circuitry for charging an energy storage device using the rectified signal and a connection between the system to free space.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements. Further, in the figures, three co-linear dots indicate that additional items of similar type to the preceding and/or succeeding items with respect to the dots may optionally exist.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. One or more embodiments are directed to a charging an energy storage device on a peripheral device via a single charging terminal.

Figure 1:
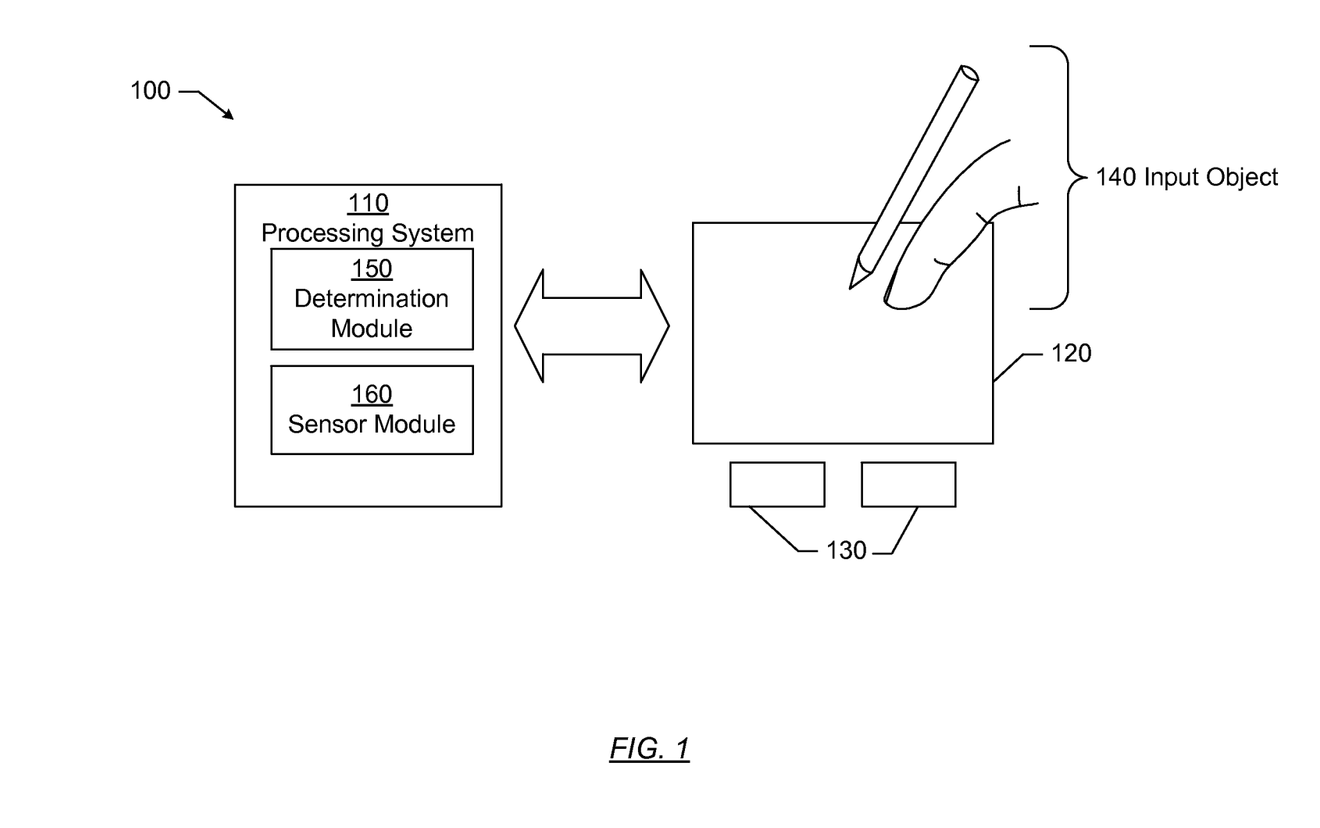
FIG. 1 is a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

In one or more embodiments of the invention, at least one of the input objects is a pen. In one or more embodiments, the pen may be an active pen or a semi-passive pen. An active pen is a pen that actively sends an electrical signal to the input device. In other words, in performing capacitive sensing of the active pen, the transmitter electrodes that transmit the transmitter signal are on the active pen. The resulting signals are received by receiver electrodes on the input device. In contrast, the semi-passive pen interacts with a capacitive sensing device by affecting the measured capacitance of the sensing device in a way similar to how a finger interacts with the input device. In other words, in sensing a semi-passive pen, the transmission and receiving of sensing signals both use electrodes on the input device. Thus, a semi-passive pen does not actively transmit a signal, but rather affects the capacitance of the sensing region. By changing a resonance frequency of the semi-passive pen, the semi-passive pen may passively transmit information to the input device. In order to change the resonance frequency, the semi-passive pen may have a power source to power a circuit that selectively modifies the resonance frequency according to the desired information to transmit. The information is detection and translated by the input device. An example of an active pen is described in U.S. patent Ser. No. 14/320,521, having publication number US-2015-0109263, which is hereby incorporated by reference. An example of a passive pen in accordance with one or more embodiments is described in U.S. patent Ser. No. 14/752,681, which is hereby incorporated by reference.

Returning to FIG. 1, in one or more embodiments of the invention, the performance by the processing system may be partitioned into frames. Each frame represents a length of time to perform a single capture of the state of the sensing region with respect to the existence of one or more input objects. The length of time may vary among frames. For example, if no input object is detected, the length of time may be shorter then when an input object is detected and additional processing is performed. In one or more embodiments of the invention, at the end of the frame, a report may be transmitted to other components of the processing system, input device, host system, or other device, or combination thereof. Each report includes positional information and frequency information regarding any input objects in the sensing region.

Figure 2:
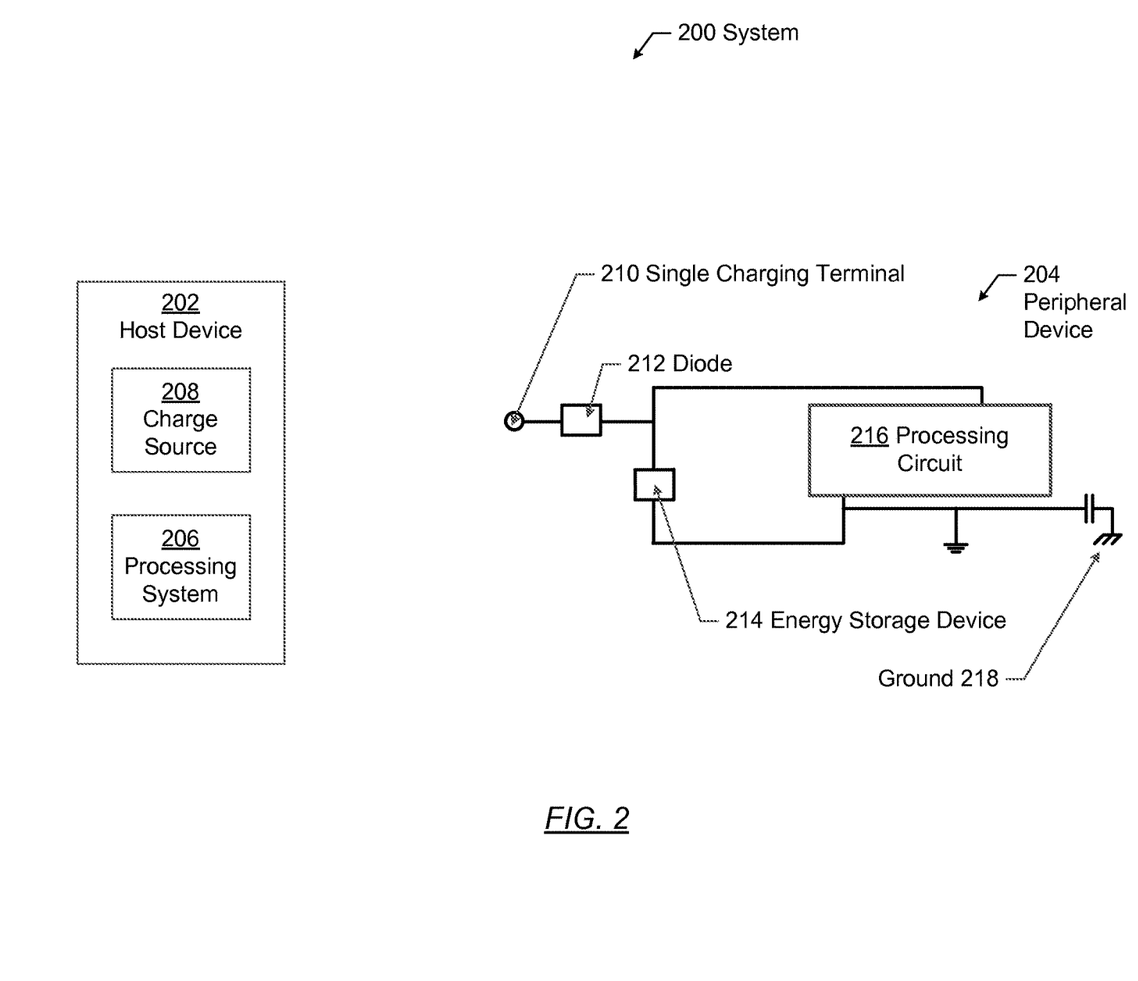
FIGS. 2 and 8 show example schematic diagrams of a system in accordance with one or more embodiments of the invention.

One or more embodiments are directed to charging a detachable peripheral device by including charge source on the host device. Turning to FIG. 2, FIG. 2 shows an example schematic diagram of a system (200) in accordance with one or more embodiments of the invention. As shown in FIG. 2, the system (200) includes a host device (202) and a peripheral device (204).

In one or more embodiments of the invention, the host device (202) includes a processing system (206) and a charge source (208). A host device (202) is any hardware device that includes functionality to interact with the peripheral device (204). For example, the host device (202) may be the input device shown in FIG. 1, a media player, or any other physical device. In one or more embodiments of the invention, the host device (202) includes a processing system (206) and a charge source (208) in accordance with one or more embodiments of the invention. The processing system (206) is a system that includes functionality to perform the functionality of the host device (202). For example, if the host device is an input device, the processing system in FIG. 2 may correspond to the processing system shown in FIG. 1. By way of another example, if the host device is a media player, the processing system may include a hardware processor, output port, software and/or firmware that includes functionality to receive a selection of media, and play the media selection using the output port. The charge source (208) is a conductive material that includes functionality to transmit an electrical charge. In one or more embodiments of the invention, the charge source (208) is an active electrode that is driven by the processing system (206) with an alternating current (AC) waveform.

Figure 8:
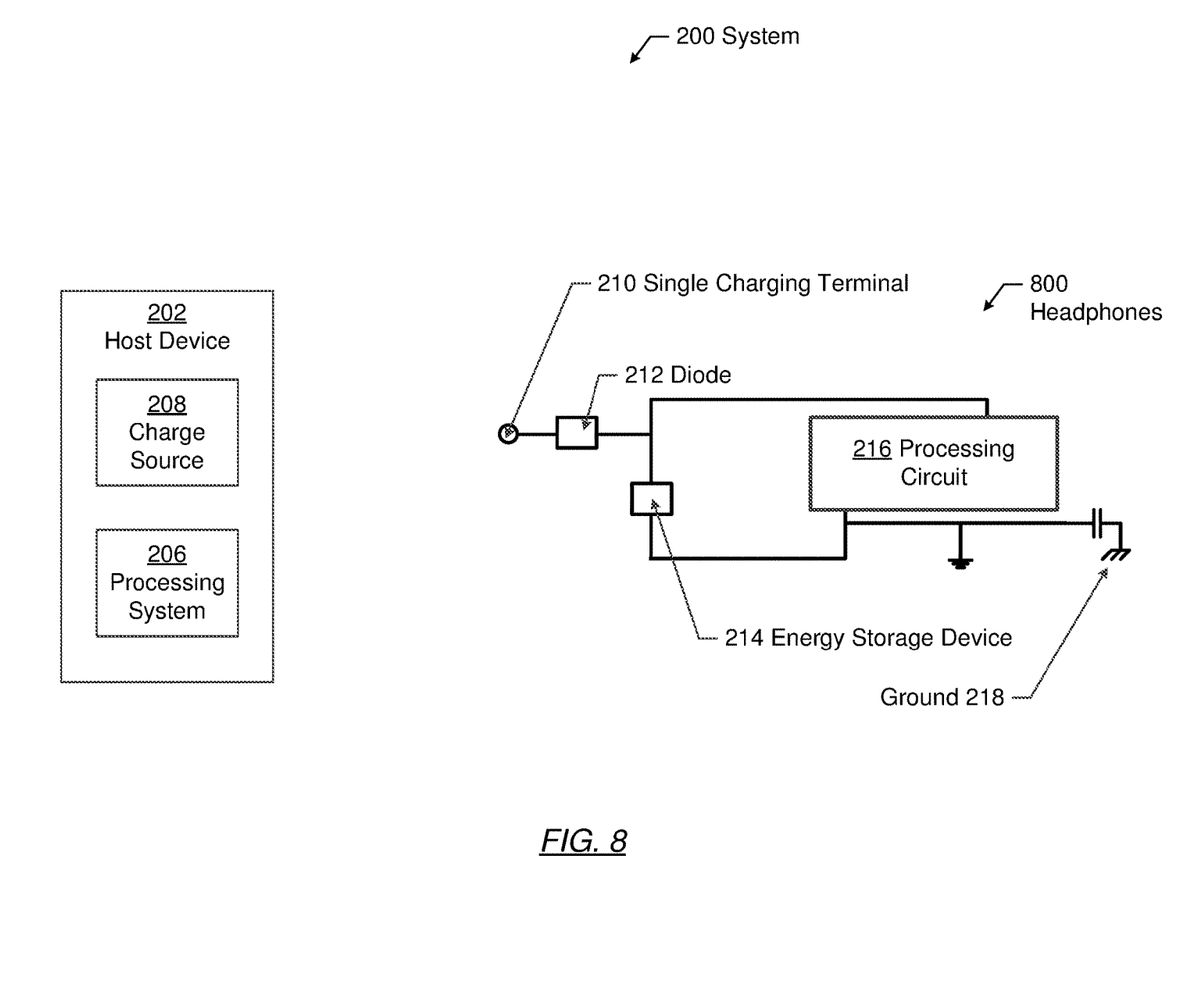

The peripheral device (204) is any physical device that receives input from the user and/or provides output to the user. For example, the peripheral device (204) may be the pen, such as the active and/or semi-passive pen described above, headphones (800 in FIG. 8), speakers, or other electronic device that operates with a host device (202). Additionally, while a capacitive pen may be a common type of pen used as a peripheral device (204), other types of pens including inductive pens may also be utilized. The peripheral device (204) includes a single charging terminal (210) connected, via charging circuitry, to diode (212), an energy storage device (214), and ground (218).

The single charging terminal (210) is an individual conductor that is entirely made of conductive material in accordance with one or more embodiments of the invention. In one or more embodiments of the invention, the single charging terminal (210) is also a pathway for active and/or passive communication with the host device (202). As shown in FIG. 2, the single charging terminal (210) is connected to one or more diodes (212). The one or more diodes (212) include functionality to rectify the AC current in accordance with one or more embodiments of the invention. In one or more embodiments of the invention, the diode may be a zener diode. For example, a zener diode may be used when the peripheral device is an active pen. By having a zener diode, the active pen may both transmit a signal per active pen operation, as well as receive the charge from the opposing direction of the zener diode.

Further, the peripheral device (204) is connected to ground (218). The ground (218) is a common ground through free space. In other words, no conductive ground path exists between the host device (202) and the peripheral device (204). Rather, the charging of the peripheral device occurs through a coupling to a user or other grounded entity. For example, the ground (218) may be, for example, through a connection to a human being holding the peripheral device (204). Interposed between the diode (212) and a ground (218) is an energy storage device (214).

In one or more embodiments of the invention, the energy storage device (214) is any physical component that stores energy. For example, the energy storage device (214) may be a battery, a capacitor, or a combination thereof.

The energy storage device (214) is connected to processing circuit (216). The processing circuit (216) includes functionality to perform the operations of the peripheral device (204). For example, in an embodiment in which the peripheral device is an active pen, the processing circuit (216) may include functionality to determine information to transmit and transmit a signal with the information. In an embodiment in which the peripheral device is a semi-passive pen, the processing circuit (216) includes functionality to determine the information to transmit, translate the information into changes in resonance frequency, and change the resonance frequency of the peripheral device (204) accordingly. In an embodiment in which the peripheral device (204) are headphones, the processing circuit (216) includes functionality to translate an audio signal received via the single charging terminal (210) into audio output and play the audio output. Further, in embodiments in which the peripheral device (204) is noise canceling headphones, the processing circuit (216) may include functionality to remove background audio noise. In some embodiments, peripheral device (204) may not include an energy storage device (214). For example, some headphones do not utilize stored energy. In that case, the peripheral device (204) may receive an audio signal via the single charging terminal (210) and the processing circuit (216) may generate audio output based on the audio signal, without storing energy in an energy storage device (214).

In the diagram shown in FIG. 2, because of the connection to free space at ground (218), when the single charging terminal (210) connects, capacitively and/or electrically, to charge source (208), a charge having an AC waveform is transformed by diode (212) to result in a positive voltage waveform to energy storage device (214). With or without connection to the single charging terminal (210), the energy storage device provides stored power to processing circuit (216).

Figure 3:
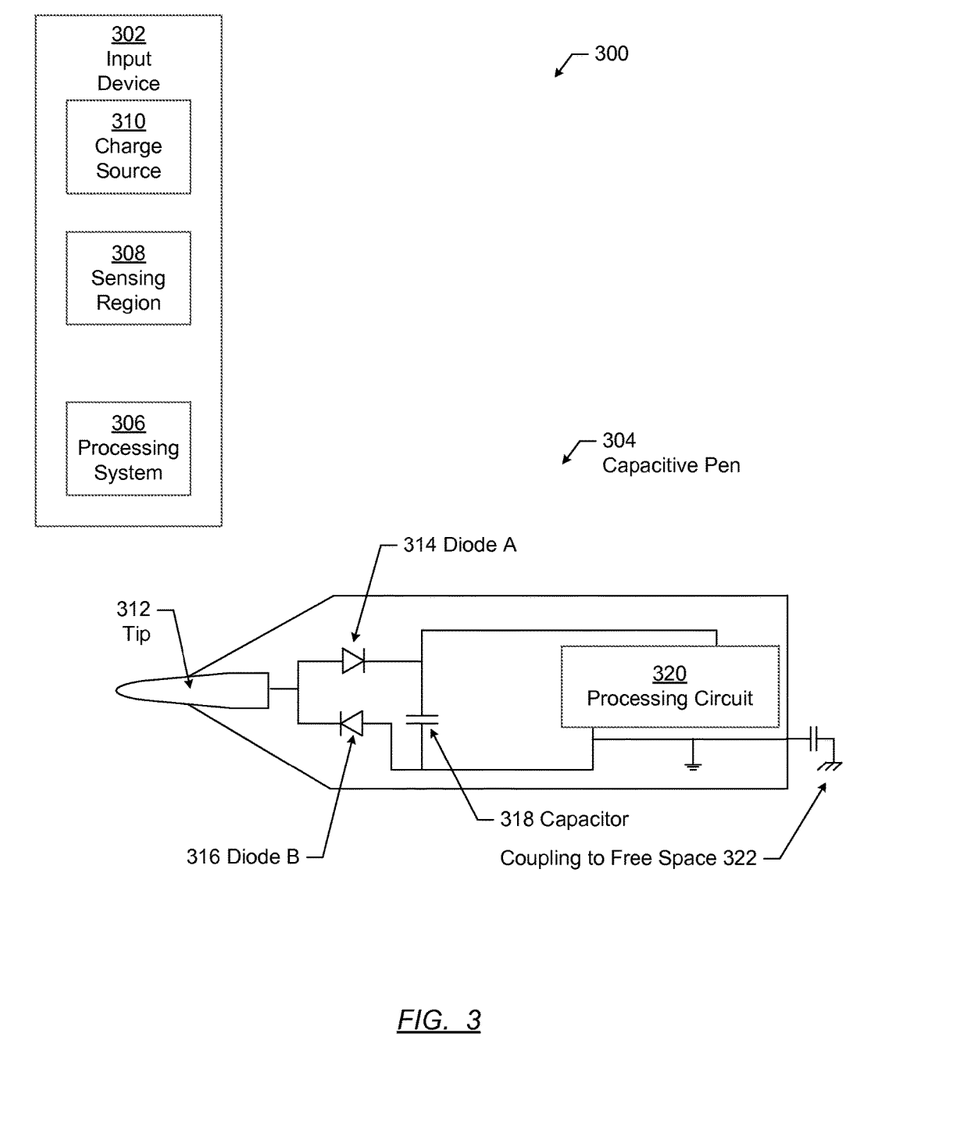
FIG. 3 shows an example system with a pen in accordance with one or more embodiments of the invention.

FIG. 3 shows an example in which the system (300) has an input device (302) as the host device and a capacitive pen (304) as the peripheral device. The input device (302) may correspond to the input device of FIG. 1. The processing system (306) and sensing region (308) may correspond to the processing system and sensing region discussed above with reference to FIG. 1. As shown, the input device (302) may further include a charge source (310), which may be similar to the charge source discussed above with reference to FIG. 2. The capacitive pen (304) may correspond to an active pen or semi-passive pen as discussed above with reference to FIG. 2.

As shown in FIG. 3, the capacitive pen (304) includes a tip (312), which is the single charging terminal and made of, at least in part, conductive material. In other words, when a user connects the tip (312) to charge source (310), the diodes (e.g., diode A (314), diode B (316)) rectify the AC signal from the charge source (310) and the capacitor (318) is charged. In other words, because of the coupling to free space (322), a single terminal tip (312) may be used to charge the capacitor (318). The capacitive pen (304) may additionally have a processing circuit (320), which may be similar to the processing circuit described above with reference to FIG. 2. Although shown with two diodes, the capacitive pen (304) may have more or fewer diodes to charge the capacitor without departing from the scope of the invention. Further, the capacitive pen (304) may have a battery instead of or in addition to capacitor (318). Additionally, the capacitor (318) may be a supercapacitor or an ultracapacitor. Although not shown in FIG. 3, the body of the capacitive pen (304) surrounding the tip may be made of insulating material. The capacitive pen may further include a griping region that is made of conductive material. Different variations of pen bodies may be used, such as the pens described in U.S. patent application Ser. No. 14/581,997, which is incorporated herein by reference.

Figure 4:
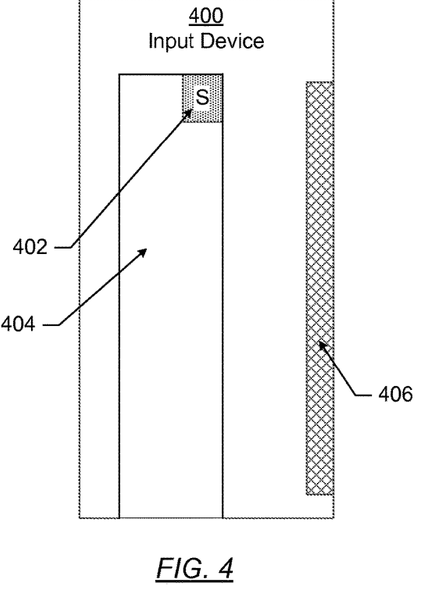
FIGS. 4, 5, and 6 show examples of an input device in accordance with one or more embodiments of the invention.
Figure 5:
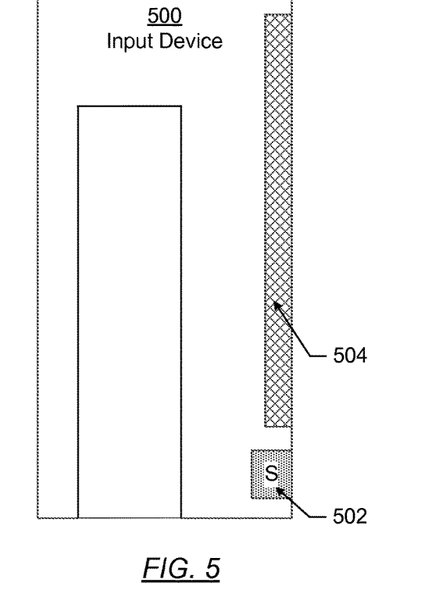
Figure 6:
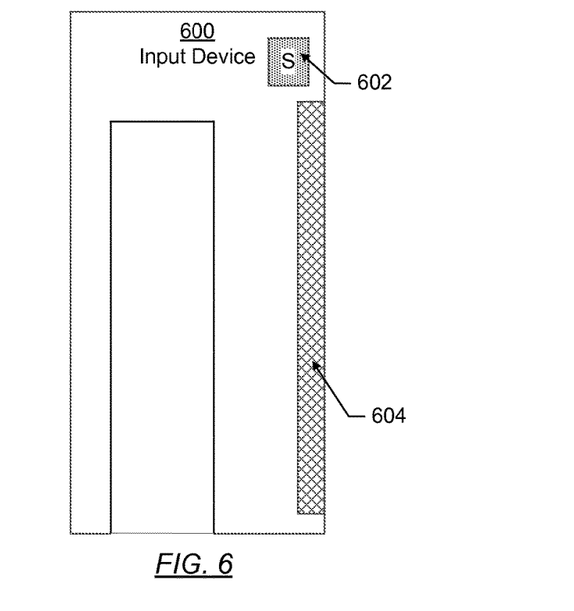

FIGS. 4, 5, and 6 shows examples of an input device in accordance with one or more embodiments of the invention. FIGS. 4, 5, and 6 are only examples and are not to scale. The input device may vary from the input device shown in FIGS. 4, 5, and 6 without departing from the scope of the invention.

FIG. 4 shows an example input device (400) in accordance with one or more embodiments of the invention. In the example shown in FIG. 4, the charge source (402) is located in a docking station (404) for the capacitive pen. In one or more embodiments of the invention, the charge source (402) is an active electrode. The input device (400) may further include a sensing region (406) in accordance with one or more embodiments of the invention. When the capacitive pen is placed in the docking station (404), the capacitive pen is charged via charge source (402) in accordance with one or more embodiments of the invention.

FIG. 5 shows an example input device (500) in accordance with one or more embodiments of the invention. In the example shown in FIG. 5, the charge source (502) is located on a button or other such exposed component of the capacitive pen. The charge source (502) may be located virtually anywhere with respect to the sensing region (504). For example, as shown in FIG. 5, the charge source is located at the bottom of the sensing region (504). To charge the capacitive pen using the embodiment shown in FIG. 5, a user may place the tip of the capacitive pen to the charge source (502). In at least some embodiments, a short length of time, such as fifteen seconds may be sufficient to charge the capacitive pen.

FIG. 6 shows an example input device (600) in accordance with one or more embodiments of the invention. In the example shown in FIG. 6, the charge source (602) is a floating active electrode. The floating active electrode may be located virtually anywhere with respect to the sensing region (604). Further, the floating active electrode may not be exposed. To charge the capacitive pen using the embodiment shown in FIG. 6, a user may place the tip over the floating active electrode.

Figure 7:
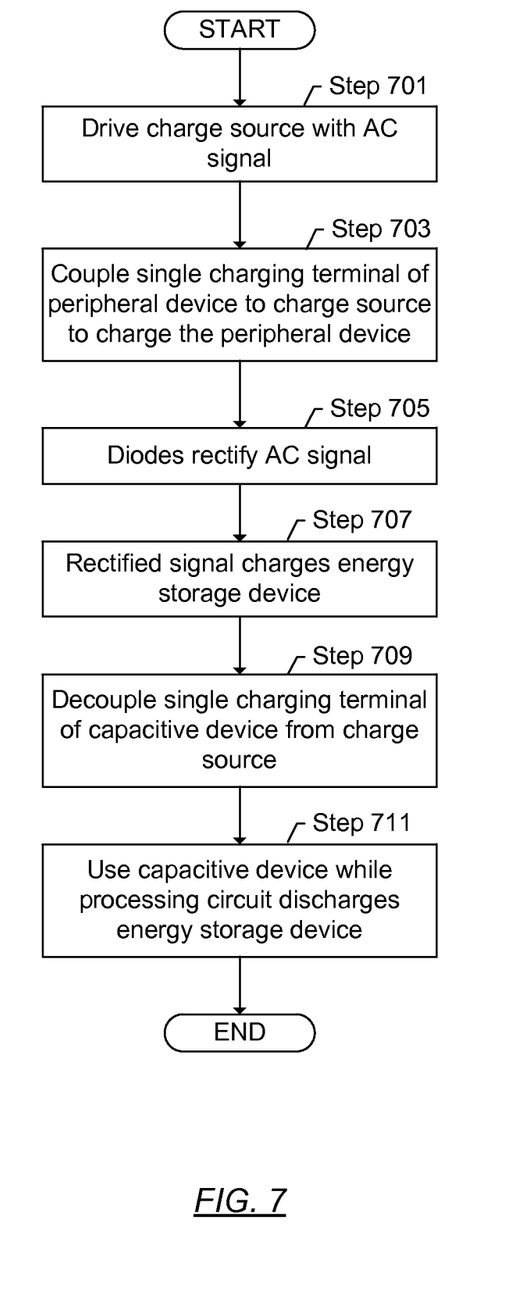
FIG. 7 shows an example in accordance with one or more embodiments of the invention.

FIG. 7 shows an example flowchart in accordance with one or more embodiments of the invention. In Step 701, a charge source is driven with an AC signal. In one or more embodiments of the invention, the charge source is driven with a square waveform. The single charging terminal of the peripheral device is coupled to the charge source to charge the peripheral device in Step 703. For example, the user may determine that the peripheral device should be charged and connect the peripheral device to the charge source. In Step 705, the diodes rectify the AC signal. For example, the diodes may change the square waveform to a DC signal. The rectified signal charges the energy storage device in Step 707. Because of the coupling to the charge source and to a grounding user or other entity, the energy storage device is charged via the single charging terminal.

In one or more embodiments of the invention, once charged, the single charging terminal may be decoupled from the charge source in Step 709. In other words, the user may optionally remove the peripheral device from contacting the charge source. In Step 711, the capacitive device may be used while the processing circuit discharges the energy storage device.

By way of an example embodiment, a headphone may be connected to the an active electrode. The active electrode may be driven with AC waveform. By modifying the frequency of the AC waveform, an audio signal may be transmitted to the headphones at the same time as the headphones are charged. In other words, for example, the processing system may be configured to interpret the changing frequency of the waveform into an audio signal and play the audio signal. Thus, a user may listen to the headphones while the headphones are charged.

In one or more embodiments of the invention, the headphones are not connected to a port. For example, the headphones may be connected via a magnet to an active electrode on an input output device, such as a mobile device.

The following examples are for example purposes only and not intended to limit the scope of the invention.

In the following example, consider the scenario in which the peripheral device is a resonating semi-passive pen. In other words, the semi-passive pen changes the resonance frequency of the input device in order to passively transmit information. In the example, the semi-passive pen may use a current of 40 nanoamperes (nA) to power a complementary metal-oxide-semiconductor integrated circuit (CMOS IC). Charging for one second via the pen tip at 3 milliamperes (mA) may provide the pen with power for 21 hours. For a small diameter (e.g., 5 mm) 220 microfarad (uF) electrolytic cap, a <1 second, 3 mA charge, may provide for 3 hours of pen operation.

An active pen may use 1 mA of current. In such a scenario, using a 6 farad (F) supercapacitor, one-wire 3 mA charging at a docking port for one hour may provide 3 hours of active pen operation.

As shown above, one or more embodiments of the invention provide a system for charging peripheral devices using a coupling to free space.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A capacitive pen comprising:
a single charging terminal composed entirely of conductive material, the single charging terminal configured to electrically or floatingly couple to an active electrode of an electronic device comprising an external surface having a capacitive pen position sensing region and a charging region,
wherein the active electrode is arranged on or beneath the charging region separate from the capacitive pen position sensing region,
wherein the electronic device drives the active electrode with an alternating current (AC) signal;

an energy storage device that is charged through the coupling of the active electrode with the single charging terminal when the capacitive pen is held by a user and the user's body serves as the return ground for the charging; and a diode for rectifying the AC signal from the active electrode to obtain a rectified signal, wherein the energy storage device is attached to the diode and configured to store energy from the rectified signal.

2. The capacitive pen of claim 1, wherein the energy storage device is a battery.

3. The capacitive pen of claim 1, wherein the energy storage device is a capacitor.

4. The capacitive pen of claim 1, wherein the capacitive pen resonates in response to a sensing frequency of the electronic device, and wherein the electronic device is a capacitive input device.

5. The capacitive pen of claim 1, wherein the diode is a zener diode.

6. The capacitive pen of claim 1, further comprising:

processing circuitry configured to be powered by the energy storage device and configured to selectively resonate the capacitive pen.

7. The system of claim 1, wherein the active electrode is located on a button of the electronic device.

8. The system of claim 1, wherein the active electrode is a floating electrode in the electronic device.

9. A system comprising:

an electronic device comprising:
   a headphone jack receptacle;
   an active electrode provided in the headphone jack receptacle; and
   a processing system for driving the active electrode with an alternating current (AC) signal; and a headphone comprising:
   a headphone jack for audio signal interfacing with the headphone jack receptacle and comprising a single charging terminal composed entirely of conductive material, the single charging terminal configured to couple to the active electrode,
   an energy storage device that is charged through the coupling of the active electrode with the single charging terminal when the user's body serves as the return ground for the charging;
   a diode for rectifying the AC signal from the active electrode to obtain a rectified signal; and
   a charging circuitry for charging the energy storage device attached to the diode and configured to store energy from the rectified signal.

10. The system of claim 9, wherein the energy storage device is a battery.

11. The system of claim 9, wherein the energy storage device is a capacitor.

12. The system of claim 9, wherein the processing system is further configured to:

modulate the frequency of the AC signal to transmit audio data to the headphone.

13. The system of claim 9, wherein the headphone comprises a processing circuit configured to obtain data from the electronic device by interpreting a modulated frequency of the AC signal.

14. The system of claim 9, the headphone further comprising:

processing circuitry configured to be powered by the energy storage device.

* * * * *